United States Patent [19]

Nomura et al.

[11] Patent Number: 5,739,547

[45] Date of Patent: Apr. 14, 1998

[54] REFLECTION TYPE DISPLAY

[75] Inventors: Takao Nomura; Satoshi Yamaue, both of Tenri; Yoshihiro Endoh, Nara-ken, all of Japan

[73] Assignee: Sharp Kabushiki Kaisha, Osaka, Japan

[21] Appl. No.: 588,385

[22] Filed: Jan. 18, 1996

[30] Foreign Application Priority Data

Jan. 20, 1995 [JP] Japan ................... 7-007508

[51] Int. Cl.$^6$ .................... H01L 29/786; H01L 29/43
[52] U.S. Cl. .................... 257/59; 257/72; 257/762; 257/763; 257/766; 257/770
[58] Field of Search .................... 257/59, 72, 766, 257/763, 762, 770

[56] References Cited

U.S. PATENT DOCUMENTS 5,498,573  3/1996  Whetten ........................... 257/59

FOREIGN PATENT DOCUMENTS 3173473  7/1991  Japan ........................... 257/59
5-76613  10/1993  Japan .
7-56194  3/1995  Japan .

*Primary Examiner*—Jerome Jackson
*Attorney, Agent, or Firm*—Nixon & Vanderhye, P.C.

[57] ABSTRACT

A reflection type display according to the present invention, which has a first substrate, a second substrate and a display medium interposed therebetween, includes: pixel electrodes arranged in rows and columns on the first substrate; canning lines each disposed adjacent to a respective one column of the pixel electrodes on the first substrate; a plurality of nonlinear resistance two terminal devices for electrically connecting each scanning line to the pixel electrodes of the respective one column; and signal lines disposed on the second substrate to cross the scanning lines. Each pixel electrode includes first and second metal layers and is insulated from the respective one of the scanning lines by an insulating layer. The materials of the first and second metal layers are different, and the material for the first metal layer has the reflectance higher than that of the material of the second metal layer. Each nonlinear resistance two terminal device includes a pair of electrodes and a nonlinear resistance layer provided between each pixel electrode and the insulating layer, one of the electrodes being a portion of the respective one of the scanning lines while the other is the second metal layer, the nonlinear resistance layer being in contact with the electrodes through a through hole provided in the insulating layer.

10 Claims, 3 Drawing Sheets

REFLECTION TYPE DISPLAY

BACKGROUND OF THE INVENTION

1. Field of the Invention

The present invention relates to a reflection type display such as a reflection type liquid crystal display using nonlinear resistance two terminal devices as switching devices.

2. Description of the Related Art

As a reflection type liquid crystal display using nonlinear resistance two terminal devices (referred to simply as nonlinear two terminal devices hereinafter) as switching devices, a display which is illustrated in FIGS. 3 and 4 has conventionally been known in the art. Hereinafter, a structure of the conventional reflection type liquid crystal display will be described with reference to FIGS. 3 and 4.

FIG. 3 is a plan view illustrating one of a pair of substrates of a reflection type liquid crystal display using nonlinear two terminal devices on which the nonlinear two terminal devices are formed (hereinafter referred to as the device substrate). FIG. 4 is a cross-sectional view taken along the line B—B' in FIG. 3. The device substrate has a glass substrate 20, and a plurality of conductive strips are formed parallel to one another on the glass substrate 20. These conductive strips function as scanning lines 13. Each conductive strip has branching portions, each of which functions as a lower electrode of the nonlinear two terminal device as will be described later. In addition, a portion of each conductive strip serves as a terminal to which a scanning line driver (not shown) is to be connected.

A semiconductor layer 14 is formed on the entire surface of the glass substrate 20 so as to cover the conductive strips 13 except the portions of the conductive strips serving as the terminals. An insulating layer 15 which has through holes 12 located above the respective branching portions of the scanning lines 13 is formed on the semiconductor layer 14. On the insulating layer 15, pixel electrodes 11 are formed over the area corresponding to the portion between the neighboring scanning lines 13. A part of the pixel electrode 11 covers the through hole 12. Therefore, the branching portion of the scanning line 13, the portion of the semiconductor layer 14, and the portion of the pixel electrode 11, which are all at the location where the through hole 12 is provided; function as a nonlinear two terminal device having a lower electrode-nonlinear resistance layer-upper electrode structure.

The reflection type liquid crystal display is formed by putting the device substrate having the structure described above onto a counter substrate and sandwiching a display medium such as a liquid crystal layer between the substrates, wherein the counter substrate has a transparent substrate on which a plurality of conductive strips which are to function as signal lines are formed such that the conductive strips oppose to the scanning lines 13 with the display medium therebetween. In doing so, the device substrate and the counter substrate are arranged such that the scanning lines 13 on the device substrate and the signal lines on the counter substrate cross substantially at right angles.

In the reflection type liquid crystal display of the structure described above, the pixel electrode 11 functions not only as a reflector which reflects incident light passing through the display medium (e.g., the liquid crystal layer) back toward the display medium, but also functions as the upper electrode of the nonlinear two terminal device. In order to have it function as the reflector, it is desirable to use metal having high reflectance. On the other hand, in order to have it function as the upper electrode of the nonlinear two terminal device, it is desirable to use metal which can optimize characteristics of the nonlinear two terminal device. The significant characteristics of the nonlinear two terminal device are, for example, the steepness of a current-voltage characteristic curve, and the positive-negative symmetry thereof when a current flowing from one electrode to another is assumed to be a positive current. If an appropriate metal as a material for the pixel electrode 11 cannot be found which can satisfactorily function both as the reflector and as the upper electrode of the nonlinear two terminal device, then one of the functions must be sacrificed. For instance, if the function as the reflector is to be sacrificed, then in order to realize a sufficiently bright display, another reflector besides the pixel electrode must be combined in the reflection type liquid crystal display.

In order to resolve the situation, it has been proposed that the pixel electrode and the upper electrode of the nonlinear two terminal device be formed separately. FIGS. 5 and 6 illustrate an example in which the pixel electrode and the upper electrode of the nonlinear two terminal device are formed of separate layers.

FIG. 6 is a cross-sectional view of a device substrate illustrated in FIG. 5 taken along the line C—C.

The device substrate has a glass substrate 30, on which a plurality of conductive strips 23 which function as scanning lines are formed parallel to one another. Similar to the conductive strip 13 described above, each conductive strip 23 has branching portions, and a portion of each conductive strip 23 serves as a terminal to which a scanning driver (not shown) is to be connected.

A semiconductor layer 24 is formed on the entire surface of the glass substrate 30 so as to cover the conductive strips 23 except the portions thereof which function as the terminals. On the semiconductor layer 24 is formed an insulating layer 25 which has through holes 22 located above the respective branching portions of the scanning lines 23. A metal layer 26 is formed on the insulating layer 25 in the vicinity of the through hole 22 so as to cover the through hole 22. In addition, pixel electrodes 21 are formed on the insulating layer 25 over the area corresponding to the portion between the neighboring scanning lines 23 so that a part of each pixel electode 21 covers the metal layer 26 as shown in FIG. 6. In such a structure described above, the branching portion of the scanning line 23, the portion of the semiconductor layer 24, and the portion of the metal layer 26, which are all at the location where the through hole 22 is provided, constitute a nonlinear two terminal device which has the lower electrode-nonlinear resistance layer-upper electrode structure.

In the reflection type liquid crystal display having the device substrate of the structure shown in FIGS. 5 and 6, the metal layer 26 and the pixel electrode 21 are provided above the through hole 22. Therefore, a metal which can optimize electrical characteristics of the nonlinear two terminal device can be used as a material for the metal layer 26, and a metal which excels in functioning as the reflector can be used as a material for the pixel electrode 21.

However, in this reflection type liquid crystal display, when compared with the reflection type liquid crystal display having the device substrate of the structure illustrated in FIGS. 3 and 4, the step of forming the metal layer 26 and the following step of patterning the metal layer 26 have been added. For this reason, the number of masks necessary in the patterning step using photolithography increases, thereby raising the production cost.

SUMMARY OF THE INVENTION

The reflection type display of this invention, which has a first substrate, a second substrate and a display medium interposed therebetween, includes: a plurality of pixel electrodes arranged in rows and columns on the first substrate; a plurality of scanning lines each disposed adjacent to a respective one of the columns of the pixel electrodes on the first substrate; a plurality of nonlinear resistance two terminal devices for electrically connecting each of the scanning lines to the pixel electrodes of the respective one of the columns; and a plurality of signal lines disposed on the second substrate to cross the scanning lines. In the reflection type display, each of the pixel electrodes includes a first metal layer and a second metal layer made of a material different from a material for the first metal layer, and is insulated from the respective one of the scanning lines by an insulating layer, the material of the first metal layer having the reflectance higher than that of the material of the second metal layer. Each of the nonlinear resistance two terminal devices includes a pair of electrodes and a nonlinear resistance layer provided between each of the pixel electrodes and the insulating layer, one of the electrodes being a portion of the respective one of the scanning lines while the other electrode is the second metal layer, the nonlinear resistance layer being in contact with the electrodes through a through hole provided in the insulating layer.

In one embodiment of the invention, the characteristics of the nonlinear resistance two terminal devices is better than the characteristics of a nonlinear two terminal device which uses the first metal layer as the other electrode.

In another embodiment of the invention, the first metal layer is selected from a group consisting of Al, Ag, and Ni.

In still another embodiment of the invention, the second metal layer is selected from a group consisting of Ti, Mo, Nb, and Cr.

In still another embodiment of the invention, the nonlinear resistance layer is made of either one of a semiconductor and an insulator.

In still another embodiment of the invention, the reflectance of the material of the first metal layer is about 80% or more.

Thus, the invention described herein makes possible the advantage of providing a reflection type display for which the most appropriate materials can be selected for a reflector and one electrode of nonlinear two terminal devices, respectively, without increasing the number of masks.

This and other advantages of the present invention will become apparent to those skilled in the art upon reading and understanding the following detailed description with reference to the accompanying figures.

DESCRIPTION OF THE PREFERRED EMBODIMENTS

Hereinafter, a reflection type liquid crystal display of the present invention will be described with reference to the figures.

Figure 1:
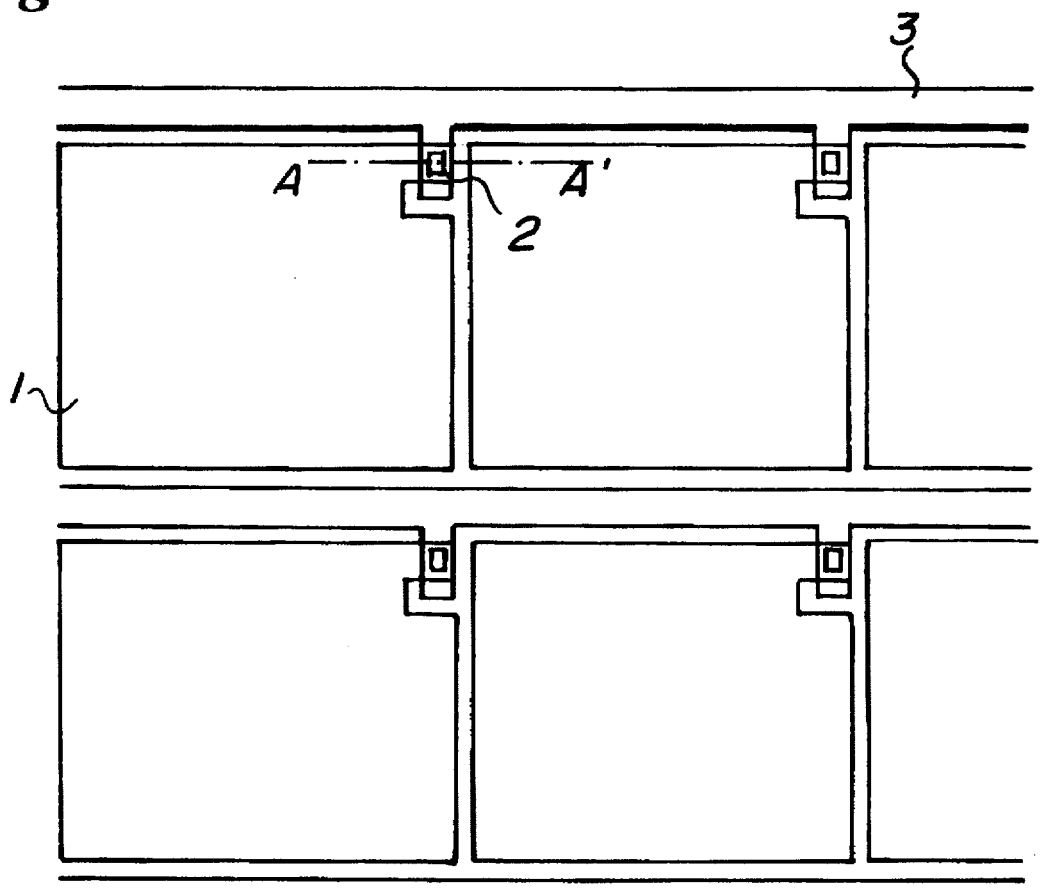
FIG. 1 is a plan view of one of a pair of substrates on which nonlinear two terminal devices are formed in an example of a reflection type liquid crystal display of the present invention.
Figure 2:
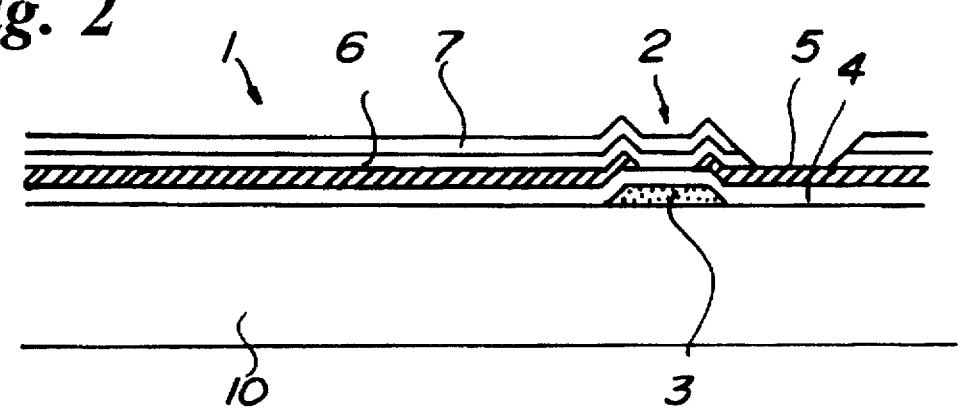
FIG. 2 is a cross-sectional view taken along the line A—A' in FIG. 1.

FIG. 1 is a plan vie of a device substrate of the reflection type liquid crystal display of the present invention, that is, one of a pair of substrates on which nonlinear two terminal devices are formed. FIG. 2 is a cross-sectional view taken along the line A—A' in FIG. 1. The device substrate has an insulating substrate 10 made of glass, etc., and a plurality of conductive strips 3 are formed parallel to one another on the substrate 10. Each conductive strip 3 functions as a scanning line, and moreover, a part thereof also serves as a terminal to be connected to a scanning line driver (not shown). Each conductive strip 3 is provided with branching portions.

A semiconductor layer 4 is formed on the conductive strip 3, covering the entire surface of the substrate, except on portions thereof which function as the terminals. On the semiconductor layer 4 is formed an insulating layer 5 which has through holes 2 located above the branching portions of the scanning lines 3. A pixel electrode 1 is formed on the insulating layer 5 over the area corresponding to the portion between the neighboring scanning lines 3. A portion of the pixel electrode 1 is formed so as to cover the through hole 2. The pixel electrode 1 is a laminated layer which consists of two metal layers, an upper metal layer 7 and a lower metal layer 6. The upper metal layer 7 is made of metal having high reflectance such as Al, and functions as a reflector. The lower metal layer 6, on the other hand, is made of metal such as Ti, which optimizes characteristics of a nonlinear two terminal device and functions as the upper electrode of the nonlinear two terminal device to be described later. Therefore, the branching portion of the scanning line 3, the portion of the semiconductor layer 4, and the portion of the lower metal layer 6, which are all at the location where the through hole 2 is provided, constitute the nonlinear two terminal device having the lower metal layer-nonlinear resistance layer-upper metal layer structure.

The device substrate having the above-described structure is attached to a counter substrate having a glass substrate on which a plurality of signal lines (not shown) are formed parallel to each other, while the substrates are arranged so that the scanning lines 3 and the signal lines cross substantially at right angles. A liquid crystal layer as a display medium is formed between the substrates.

Hereinafter, an example of a method for fabricating this reflection type liquid crystal display will be described.

First, a layer of conductive metal material which can be used as an electrode of a nonlinear two terminal device is formed on the entire surface of the insulating substrate 10. The layer is then patterned into a prescribed shape to form a plurality of conductive strips 3 each of which is equipped with the portions. In this example, #7059 Fusion Pilex Glass (manufactured by Corning Japan Co., Ltd.) is used as an insulating substrate, a Ta layer is deposited to about 200 nm thickness by sputtering, and the deposited Ta layer is patterned by photolithography.

Then, the semiconductor layer 4 is formed on the entire surface of the substrate 10, followed by removing the portions of the semiconductor layer 4 formed which is on the portion of the conductive strip 3 and is to function as the terminals to be connected to the scanning line driver. In the present example, a ZnS layer is deposited to a 100 nm thickness by sputtering, and this layer is patterned by photolithography.

Next, an insulating layer 5 is formed on the entire surface of the substrate 10. In the present example, an acrylic photosensitive resin is used as a material for the insulating layer 5, and is applied on the substrate 10 using a spinner. Then, the applied resin is exposed to light and developed, forming the insulating layer 5 having a thickness of about 300 nm which has through holes 2 at the branching portions of the scanning lines 3, except above the portions of the scanning line 3 which are to function as the terminals. As described, by using the photosensitive material as the material for the insulating layer 5, the steps of etching and peeling the resist can be omitted, thereby leading to the simplification of the process.

Later, a lower metal layer 6 and an upper metal layer 7 are successively formed in this order on the entire surface of the substrate 10. In this example, Ti is used as a material for the lower metal layer 6, and the Ti layer is deposited by sputtering to have a thickness of 100 nm. As a material for the upper metal layer 7, Al is used. The Al layer is deposited by sputtering to have a thickness of 100 nm.

Next, the lower metal layer 6 and the upper metal layer 7 are patterned by photolithography using the same pattern, thereby pixel electrode 1 consisting of a lamination of two layers is formed. This completes a device substrate on which nonlinear resistance two terminal devices are formed at the location where the through holes 2 of the insulating layer 5 is provided. Each nonlinear resistance two terminal device comprises the branching portion of the scanning line 3 as a lower electrode, the semiconductor layer 4 as a nonlinear resistance layer, and the thin film of Ti (the lower metal layer 6) of the pixel electrode 1 as an upper electrode.

On the other hand, the counter substrate is fabricated as follows. First, a conductive layer such as an ITO layer is formed on an insulating substrate made of materials such as glass. Next, the conductive layer is patterned into a stripe shape to form a plurality of conductive strips which are to be used as signal lines.

After forming an alignment film on a surface of each of the substrates on which the conductive strips are formed, the two substrates are attached to each other such that the scanning lines and the signal lines cross at right angles. Next, liquid crystal material is injected between the two substrates. Then, the two substrates are sealed. This completes the reflection type liquid crystal display which has a liquid crystal layer as a display medium. Materials other than the liquid crystal layer can be used as a display medium.

In the reflection type liquid crystal display of the present invention, the metal layer 6 which is one of the two layers constituting the pixel electrode 1, the branching portion of the scanning line 3 comprising the Ta layer, and the ZnS layer 4 are respectively used as an upper electrode, a lower electrode, and nonlinear resistance layer, to constitute the nonlinear two terminal device. Therefore, the material for the metal layer 6 can be selected so as to improve the characteristics of the nonlinear two terminal device, such as the steepness of the current-voltage characteristics curve and the positive-negative symmetry thereof. In the present example, by using Ti as the material for the metal layer 6, the nonlinear two terminal device whose current-voltage characteristic curve is substantially symmetrical and satisfactorily steep is obtained.

In the reflection type liquid crystal display of the present invention, the metal layer 7 which is one of the two layers constituting the pixel electrode 1, functions as a reflector. As a material for the metal layer 7, a material having reflectance higher than that of the material for the metal layer 6 is used. Furthermore, in order to realize a sufficiently bright display without an additional reflector other than the metal layer 7 to be combined with the reflection type liquid crystal display, it is preferably that the metal layer 7 is formed of a material whose reflectance is more than 80%. In the present example, by using Al which has the sufficiently high reflectance (reflectance: 90%) as a material for the metal layer 7, a display which is sufficiently bright can be obtained without raising the cost by separately combining the additional reflector to the reflection type liquid crystal display.

Figure 3:
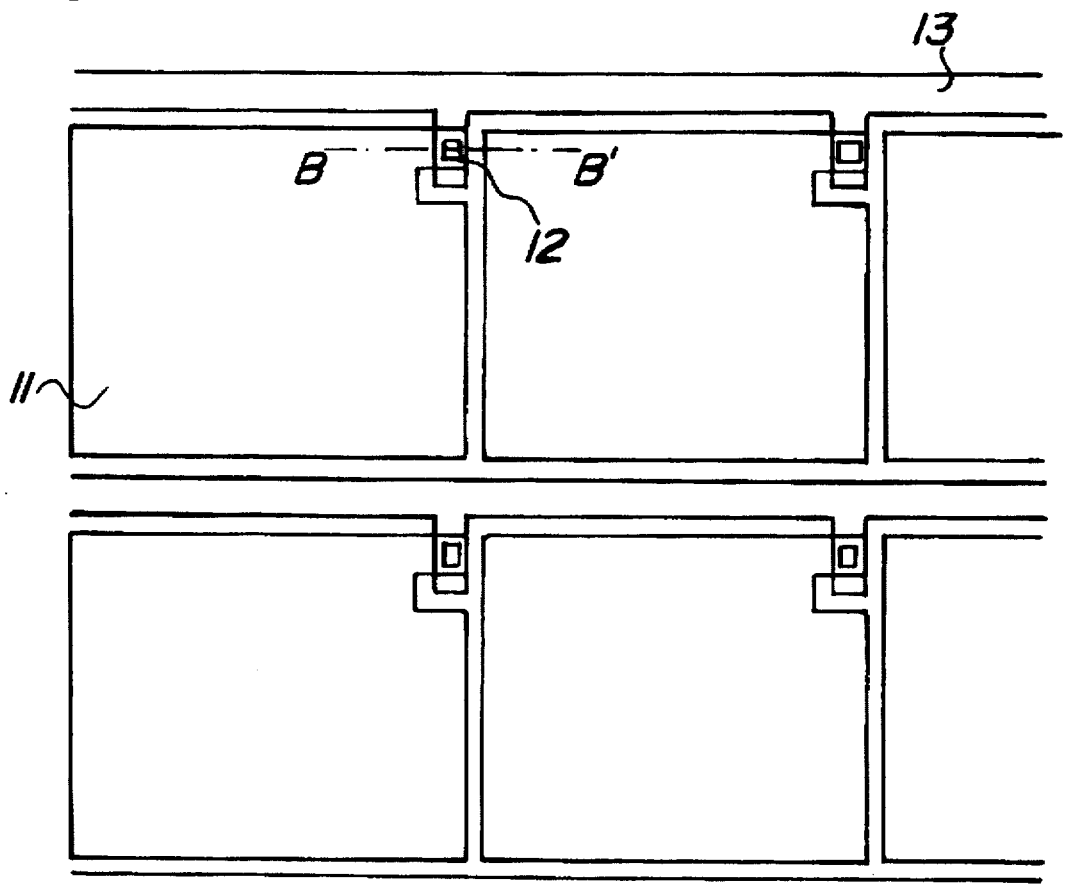
FIG. 3 is a plan view of one of a pair of substrates on which nonlinear two terminal devices are formed in an example of a conventional reflection type liquid crystal display.
Figure 4:
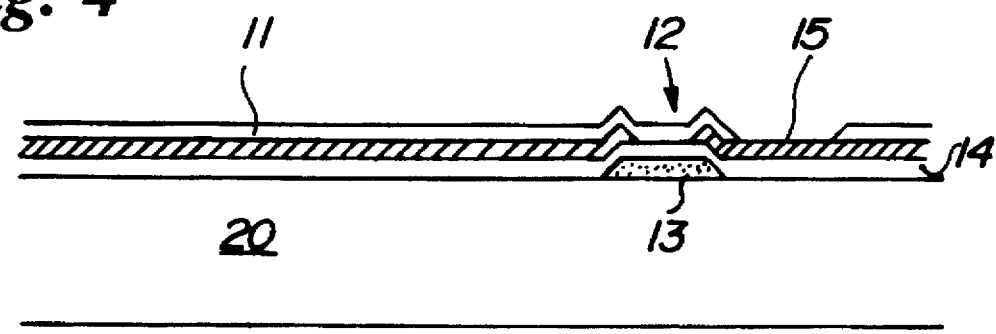
FIG. 4 is a cross-sectional view taken along the line B—B' in FIG. 3.

On the other hand, in the conventional structure illustrated in FIGS. 3 and 4, where the reflection type liquid crystal display uses a single layer of sufficiently high reflectance such as an Al layer for the pixel electrode, the symmetrical current-voltage characteristic curve is not obtained. Furthermore, if only one Ti layer is used for the pixel electrode 11 in this conventional liquid crystal display, which can optimize the current-voltage characteristic curve of the nonlinear two terminal device, a sufficiently bright display cannot be realized since the reflectance of Ti is as low as 50%.

Figure 5:
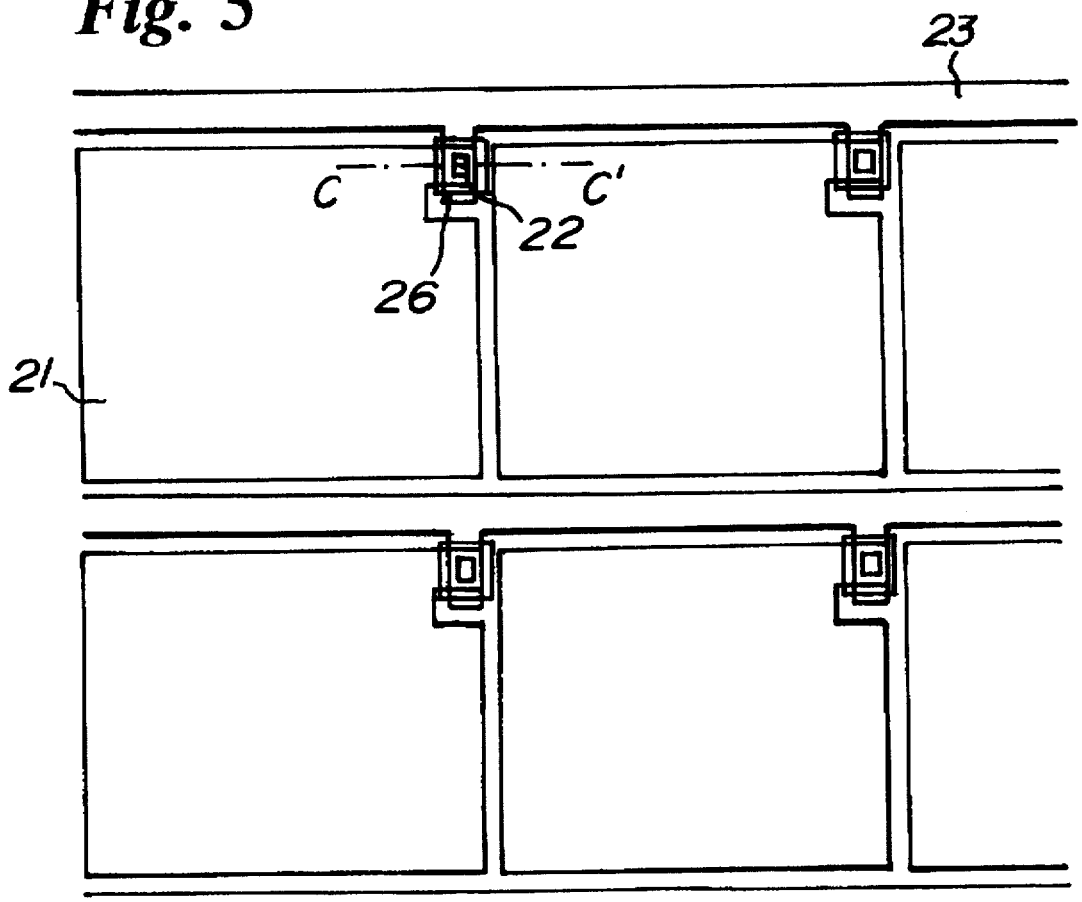
FIG. 5 is a plan view of one of a pair of substrates on which nonlinear two terminal devices are formed in another example of a conventional reflection type liquid crystal display.
Figure 6:
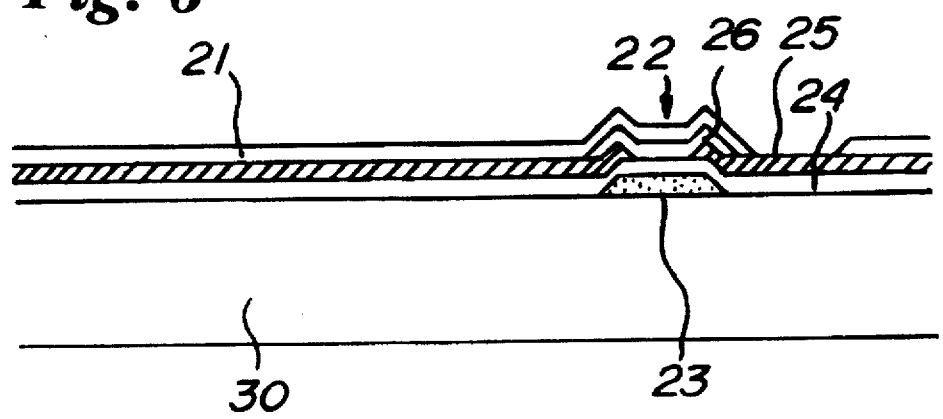
FIG. 6 is a cross-sectional view taken along the line C—C' in FIG. 5.

Furthermore, in the reflection type liquid crystal display of the present example, when compared with the conventional reflection type liquid crystal display having the device substrate of the structure illustrated in FIGS. 3 and 4, there is only one additional depositing step of the metal layer by sputtering. Neither the number of patterning using photolithography nor the number of masks to be used increases. Therefore, it becomes possible to provide a reflection type liquid crystal display in which the most appropriate materials can be selected for the reflector and the upper metal layer of the nonlinear resistance two terminal device, without considerably increasing the production cost, unlike the conventional reflection type liquid crystal display having the device substrate of the structure illustrated in FIGS. 5 and 6.

In the above example, although Ti is used as a material for the metal layer 6 which functions as the upper electrode of the nonlinear two terminal device, the material for the metal layer 6 is not limited to Ti. Another material which can optimize the characteristics of the nonlinear two terminal device, for example, Mo, Ta, Nb, and Cr, can be used as long as the material of the metal layer 6 is selected taking into consideration the material for the lower electrode, the material for the nonlinear resistance layer, and the condition where the metal layer 6 is deposited. Moreover, although Al is used in the above example as the material for the metal layer 7 which functions as the reflector, the material for the metal layer 7 is not limited to Al but it requires only that the metal layer have a high reflectance. For instance, Ag, Ni, etc. can be used instead of Al.

The materials, the method of fabrication, etc., of the scanning line 3 which serves as the lower electrode of the nonlinear two terminal device and of the semiconductor layer 4 which serves as the nonlinear resistance layer thereof, are not limited to those in the above example. The nonlinear resistance layer, for instance, can be an insulating layer made of $Ta_2O_5$, etc.

In the example described above, one of the two metal layers which constitute the pixel electrode is used as the upper electrode of the nonlinear two terminal device, and the portion of the scanning line is used as the lower electrode thereof. Conversely, when one of the metal layers constituting the pixel electrode is used as the lower electrode and a portion of the scanning line is used as the upper electrode, the same effect as described above can be obtained.

As is apparent from the above description, in the reflection type liquid crystal display of the present invention, the pixel electrode consists of a lamination of two layers, namely, the metal layer which functions as the upper layer of the nonlinear two terminal device and the metal layer which functions as the reflector. For this reason, not only the characteristics of the non-linear two terminal device such as the steepness of the current-voltage characteristics curve and positive-negative symmetry thereof can be optimized, but a reflectance which is sufficiently high can also be secured. Therefore, neither the function as the electrode of the nonlinear two terminal device nor the function as the reflector has to be sacrificed. Furthermore, since the number of masks to be used does not have to be increased, the production cost can be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflection type display having a first substrate, a second substrate and a display medium interposed therebetween, comprising:

a plurality of pixel electrodes arranged in rows and columns on the first substrate;

a plurality of scanning lines each disposed adjacent to a respective one of the columns of the pixel electrodes on the first substrate;

a plurality of nonlinear resistance two terminal devices for electrically connecting each of the scanning lines to the pixel electrodes of the respective one of the columns; and a plurality of signal lines disposed on the second substrate to cross the scanning lines;

wherein each of the pixel electrodes comprises a first metal layer and a second metal layer made of a material different from a material for the first metal layer, the second metal layer being disposed substantially under the entirety of the first metal layer, the material of the first metal layer has the reflectance higher than that of the material of the second metal layer, and each of the pixel electrodes is insulated from the respective one of the scanning lines by an insulating layer, and wherein each of the nonlinear resistance two terminal devices comprises a pair of electrodes and a nonlinear resistance layer provided between each of the pixel electrodes and the insulating layer, one of the electrodes being a portion of the respective one of the scanning lines while the other electrode is the second metal layer, the nonlinear resistance layer being in contact with the electrodes through a through hole provided in the insulating layer.

2. A reflection type display according to claim 1, wherein a current-voltage characteristic curve of each of the nonlinear resistance two terminal devices is steeper than a current-voltage characteristic curve of a nonlinear two terminal device which uses the first metal layer as the other electrodes.

3. A reflection type display according to claim 2, wherein the first metal layer is selected from a group consisting of Al, Ag, and Ni.

4. A reflection type display according to claim 3, wherein the second metal layer is selected from a group consisting of Ti, Mo, Nb, and Cr.

5. A reflection type display according to claim 1, wherein the nonlinear resistance layer is made of either one of a semiconductor and an insulator.

6. A reflection type display according to claim 1, wherein the reflectance of the material of the first metal layer is about 80% or more.

7. A reflection type display according to claim 1, wherein a positive-negative symmetry of a current-voltage characteristic curve of each of the nonlinear resistance two terminal devices is superior to a positive-negative symmetry of a current-voltage characteristic curve of a nonlinear two terminal device which uses the first metal layer as the other electrode.

8. A reflection type display according to claim 7, wherein the first metal layer is selected from a group consisting of Al, Ag, and Ni.

9. A reflection type display according to claim 8, wherein the second metal layer is selected from a group consisting of Ti, Mo, Nb, and Cr.

10. A reflection type display according to claim 1, wherein the configuration of the second metal layer coincides with the configuration of the first metal layer.

* * * * *